United States Patent [19]

Sauter

[11] 3,897,427
[45] July 29, 1975

[54] 2-PHENYL-2,3-DIHYDRO-BENZO [b]-THIOPHENE-1,1-DIOXIDE DERIVATIVES

[75] Inventor: Friedrich Sauter, Vienne, Austria

[73] Assignee: Centre d'Etudes pour l'Industrie Pharmaceutique, Toulouse, France

[22] Filed: Aug. 7, 1973

[21] Appl. No.: 386,387

[30] Foreign Application Priority Data
Aug. 21, 1972    Austria .............................. 7179/72

[52] U.S. Cl. .................. 260/247.1 P; 260/268 BC; 260/293.57; 260/326.82; 260/330.5; 424/248; 424/250; 424/267; 424/274
[51] Int. Cl.² ...................................... C07D 333/66
[58] Field of Search .. 260/247.1 P, 268 BC, 293.57, 260/326.82, 330.5

[56] References Cited
UNITED STATES PATENTS

| | | | |
|---|---|---|---|
| 2,430,821 | 11/1947 | Morris et al. ..................... | 260/332.1 |
| 2,530,070 | 11/1950 | Morris et al. ................... | 260/247.1 P |
| 2,610,183 | 9/1952 | McKellin et al. ............... | 260/247.1 P |
| 2,666,762 | 1/1954 | Cusic ........................... | 260/247.1 P |
| 2,666,763 | 1/1954 | Cusic ........................... | 260/247.1 P |
| 2,980,697 | 4/1961 | Dann ............................. | 260/330.5 |
| 3,629,437 | 12/1971 | Rosen et al. ................... | 260/247.1 P |

OTHER PUBLICATIONS
Bordwell et al., JACS, 72, (1950); pp. 1985–8.

Primary Examiner—Lorraine A. Weinberger
Assistant Examiner—Michael Shippen
Attorney, Agent, or Firm—Young & Thompson

[57] ABSTRACT

This invention relates to new 2-phenyl-2,3-dihydro-benzo[b]-thiophene-1,1-dioxide derivatives having the formula:

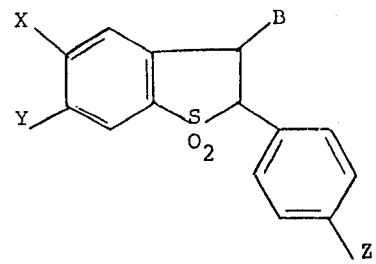

in which X and Y, which may be the same or different, represent each hydrogen, chlorine, bromine, or a lower alkyl group having 1–4 carbon atoms; Z represents hydrogen, chlorine, bromine, or a lower alkyl group having 1–4 carbon atoms or a lower alkyl group having 1–4 carbon atoms; and B represents the residue of a heterocyclic secondary amine whose nitrogen atom is bound to the 3-position of the benzo [b]thiophene ring; and their acid addition salts with inorganic and organic acids.

Said compounds possess the therapeutically useful anti-inflammatory, diuretic and antalgic properties.

9 Claims, No Drawings

2-PHENYL-2,3-DIHYDRO-BENZO[b]THIOPHENE-1,1-DIOXIDE DERIVATIVES

This invention relates to new substituted derivatives of 2-phenyl-2,3-dihydro-benzo[b]thiophene-1,1-dioxide and their salts, to a process for their preparation and to their applications, particularly in human and veterinary therapeutics.

The new derivatives of this invention have the general formula:

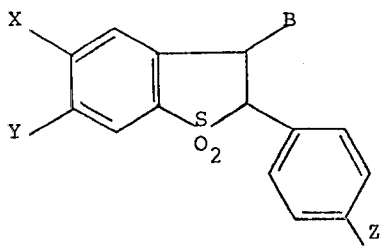

in which X and Y, which may be the same or different, represent each H, Cl, Br or a lower alkyl group having 1–4 carbon atoms; Z represents H, Cl, Br, a lower alkyl group having 1–4 carbon atoms, typically methyl, or a lower alkoxy group having 1–4 carbon atoms, typically methoxy, and B represents the residue of a heterocyclic secondary amine (such as pyrrolidine, piperidine, morpholine, hexamethyleneimine or piperazine optionally substituted at the second N atom with an alkyl residue having at most 3 carbon atoms) whose nitrogen atom is bound to the 3-position of the benzo[b]thiophene ring.

The invention includes also within its scope the acid addition salts of compounds of the formula (I) formed with inorganic and organic acids.

The invention relates also to a process for the preparation of the aforementioned new derivatives, comprising reacting a compound having the formula:

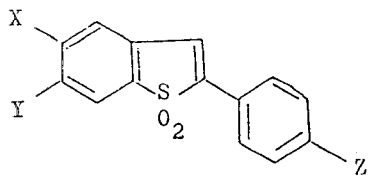

in which X, Y and Z have the above-defined meanings, with a heterocyclic secondary amine of the formula:

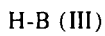

in which B has the above-defined meaning, and then, if desired, salifying the resulting compound of the formula (I) with an inorganic or organic acid.

The starting compounds having the general formula (II) may be prepared by oxidation of thionaphthenes according to the usual reaction, for example with $H_2O_2$ within acetic acid, from the correspondingly substituted 2-phenyl-benzo[b]thiophenes which, in turn, may be obtained according to methods known in the literature or by analogous methods (see, for example, O. DANN and co-workers, Ann. Chem., 734 (1970), p.23; A. E. SIEGRIST and H. R. MEYER, Helv. Chim. Acta, 52 (1969), page 1282, etc..).

The following non limiting examples are given to illustrate the preparation of the compounds according to the invention.

EXAMPLE 1

2-Phenyl-3-piperidino-2,3-dihydro-benzo[b]thiophene-1,1-dioxide a. 30 percent $H_2O_2$ (about 50 ml) is added dropwise to a solution of 2-phenyl-benzo[b]thiophene (210.3 g) (prepared according to O. DANN and M. KOKORNDZ, Chem. Ber., 91, (1958), page 172) heated at 90°C in glacial acetic acid (1000 ml). The strongly exothermic oxidation reaction is then initiated by addition of a small amount of acetic anhydride and the reaction is continued with dropwise addition of 30 percent $H_2O_2$ (450 ml) under constant strong refluxing conditions. Precipitation of the already partly crystalline material in the hot is obtained by addition of water (2000 ml) and stirring during several hours. After filtration with a water-pump and washing with water, there are obtained about 200 g of yellow crystalline material. Recrystallization from aqueous acetone or xylene gives 2-phenyl-benzo[b]thiophene-1,1-dioxide as almost colorless crystals melting at 175°–177°C.

b. 2-Phenyl-benzo[b]thiophene-1,1-dioxide (12.0 g) is refluxed during 18 hours in piperidine (100 ml). The excess piperidine is then distilled under reduced pressure and the residual crude material is recrystallized from ethanol with added active charcoal, to give 12.4 g 2-phenyl-3-piperidino-2,3-dihydro-benzo[b]-thiophene-1,1-dioxide as colorless needles having a melting point of 191°–192°C.

EXAMPLE 2

3-Morpholino-2-phenyl-2,3-dihydro-benzo[b]thiophene-1,1-dioxide

2-Phenyl-benzo[b]thiophene-1,1-dioxide (12.5 g) is refluxed during 18 hours in morpholine (100 ml). The excess morpholine is then distilled under reduced pressure and the residual crude matetrial is recrystallized from ethanol with added active charcoal, to give 10.4 g of 3-morpholino-2-phenyl-2,3-dihydro-benzo[b]thiophene-1,1-dioxide as colorless plates having a melting point of 202°–204°C.

EXAMPLE 3

2-Phenyl-3-(1-pyrrolidinyl)-2,3-dihydro-benzo[b]thiophene-1,1-dioxide

2-Phenyl-benzo[b]thiophene-1,1-dioxide (8.0 g) is refluxed during 20 hours in pyrrolidine (70 ml). After concentration under reduced pressure, the solution is added, with stirring, to about 300 ml water, and a precipitate is formed; the latter is filtered with a water-pump and washed with water. The resulting material is dissolved in hot 2N HCl; the resulting solution is filtered and made alkaline by addition of $NH_3$. The crude material precipitates as a white deposit and is then filtered with a water-pump, washed with water and dried, to give 5.9 g of crude 2-phenyl-3-(1-pyrrolidinyl)-2,3-dihydro-benzo[b]thiophene-1,1-dioxide which, on recrystallization from ethanol, gives colorless crystals having a melting point of 127°–129°C.

EXAMPLE 4

3-(1-Perhydroazepinyl)-2-phenyl-2,3-dihydro-benzo[b]thiophene-1,1-dioxide

2-Phenyl-benzo[b]thiophene-1,1-dioxide (10.0 g) is refluxed during 65 hours in hexamethyleneimine (60 ml). Evaporation of the solution under reduced pressure leaves an oily residue which crystallizes on trituration with methanol. The resulting crude material gives, after three recrystallizations from ethanol, 5.8 g of colorless crystals of 3-(1-perhydroazepinyl)-2-phenyl-2,3-dihydro-benzo[b]thiophene-1,1-dioxide having a melting point of 143°–146°C.

EXAMPLE 5

3-(4-Methyl-piperazin-1-yl)-2-phenyl-2,3-dihydro-benzo[b]-thiophene-1,1-dioxide

2-Phenyl-benzo[b]thiophene-1,1-dioxide (10.0 g) is dissolved, with heating, in N-methylpiperazine (30 ml); the reaction mixture is refluxed during six hours and is then added, with stirring, to 200 ml water; a flocky precipitate is formed. The precipitate is taken up into benzene; the benzene solution is repeatedly extracted with 2N HCl, with stirring, and the combined acidic extracts are made alkaline by addition of $NH_3$. The resulting white precipitate is filtered with a water-pump, washed, dried, and recrystallized from benzene-dioxan, to give 5.9 g of 3-(4-methyl-piperazin-1-yl)-2-phenyl-2,3-dihydro-benzo[b]thiophene-1,1-dioxide as colorless needles having a melting point of 201°–203°C.

The maleate is obtained as colorless crystals. Decomposition at 205°–207°C.

EXAMPLE 6

2-Phenyl-3-(piperazin-1-yl)-2,3-dihydro-benzo[b]thiophene-1,1-dioxide

2-Phenyl-benzo[b]thiophene-1,1-dioxide (10.2 g) and anhydrous piperazine (40.0 g) are contacted during 80 minutes at 110°–120°C. After cooling, the reaction mixture is washed with water and is then taken up into methylene chloride. The resulting solution is extracted, with stirring, with dilute HCl, and the combined HCl extracts are made weakly alkaline after purification. The almost colorless resulting precipitate is filtered with a water-pump, washed with water and dried, to give 7.2 g of 2-phenyl-3-(piperazin-1-yl)-2,3-dihydro-benzo[b]thiophene-1,1-dioxide (crude) as almost colorless crystals, m.p. = 198°–201°C.

The crude material is used without further purification for the preparation of salts.

EXAMPLE 7

5-Chloro-3-(4-methyl-piperazin-1-yl)-2-phenyl-2,3-dihydro-benzo[b]thiophene-1,1-dioxide 5-Chloro-2-phenyl-benzo[b]thiophene-1,1-dioxide (25.0 g) is refluxed during one hour in N-methylpiperazine (80.0 g). After evaporation of the solution under reduced pressure, the residue is taken up into hot methanol (about 250 ml), the resulting solution is filtered hot and is then cooled to −20°C. The crude precipitate is filtered with a water-pump and dissolved with dilute HCl; the acidic solution is purified and the base is reprecipitated on alkalinisation with $NH_3$. The resulting precipitate is filtered with a water-pump, washed with water and dried, to give 20.4 g of crude 5-chloro-3-(4-methylpiperazin-1-yl)-2-phenyl-2,3-dihydro-benzo[b]thiophene-1,1-dioxide having a melting point (after several recrystallizations from methanol in the presence of active charcoal) of 190°–193°.

Maleate: colorless crystals. Decomposition from 225°C.

EXAMPLE 8

2-(4-Chloro-phenyl)-3-(4-methyl-piperazin-1-yl)-2,3-dihydro-benzo[b]thiophene-1,1-dioxide 2-(4-Chloro-phenyl)-benzo[b]thiophene-1,1-dioxide is refluxed during 90 minutes in N-methylpiperazine (70 ml). After distillation of the excess N-methylpiperazine under reduced pressure, the crystalline residue is dissolved in methylene chloride. The resulting solution is washed with water, extracted with dilute HCl, with stirring, the combined acidic extracts are then purified and made alkaline with $NH_3$. The crude base which precipitates out is taken up into methylene chloride and the resulting solution is dried over $Na_2SO_4$ and evaporated. Recrystallization of the crystalline residue from n-propanol gives 5.4 g of 2-(4-chloro-phenyl)-3-(4-methyl-piperazin-1-yl)-2,3-dihydro-benzo[b]thiophene-1,1-dioxide as colorless needles which decompose at 232°–234°C.

Maleate: colorless crystals. Decomposition from 202°C.

The compounds of the general formula (I) and their acid addition salts with pharmaceutically acceptable acids are therapeutically useful, particularly in view of their anti-inflammatory, diuretic and antalgic properties.

Thus, the invention relates also to a therapeutic composition having in particular an anti-inflammatory, antalgic and diuretic activity, comprising, as active ingredient, a derivative of the above-mentioned formula (I) or a pharmaceutically acceptable salt thereof.

The results of a toxicological and pharmacological investigation demonstrating the outstanding therapeutic usefulness of the derivatives of this invention are summarized below.

I. TOXICOLOGICAL INVESTIGATION

This investigation related to the acute toxicity, the subchronic toxicity, the chronic toxicity, the delayed toxicity, the local and systemic tolerance. It evidenced the low toxicity and the good tolerance of the compounds of this invention.

For indicative purposes, the LD 50/24h/kg determined in mice according to the method by MILLER and TAINTER, was as follows:

| Product | Route of administration | |
|---|---|---|
|  | p.o. | i.v. |
| 2-phenyl-3-piperidino-2,3-dihydro-benzo[b]thiophene-1,1-dioxide | 1075 mg | 87 mg |
| 3-morpholino-2-phenyl-2,3-dihydro-benzo[b]thiophene-1,1-dioxide | 1050 mg | — |
| 2-phenyl-3-(1-pyrrolidinyl)-2,3-dihydro-benzo[b]thiophene-1,1-dioxide | 1100 mg | 92 mg |
| 3-(1-perhydroazepinyl)-2-phenyl-2,3-dihydro-benzo[b]thiophene-1,1-dioxide | 1025 mg | — |
| 3-(4-methyl-piperazin-1-yl)-2-phenyl-2,3-dihydro-benzo[b]thiophene-1,1-dioxide | 1150 mg | 90 mg |

II. PHARMACOLOGICAL INVESTIGATION

This investigation related to the anti-inflammatory, antalgic and diuretic actions of the compounds of this invention.

a. Anti-inflammatory activity

It was investigated by the carrageenin-induced localized oedema method.

0.3 ml of a 1 percent aqueous carrageenin solution are administered to rats and the reference material or the test material is also administered one hour prior to said injection and simultaneously with said injection, said doses being administered by gastric intubation at a dosage of 30 mg/kg for indometacine (reference material) and of 100 mg/kg for the compounds of this invention.

3 hours later, the increase of the thickness of the rear paw of the test animal is measured with a Roch micrometer.

The following average increases were obtained:
an increase by a factor of 2.69 in the untreated controls (but which have been given carrageenin);
an increase by a factor of 1.85 in the animals treated with the compounds of this invention;
an increase by a factor of 1.73 in the animals treated with the reference material.

b. Antalgic activity

It was investigated according to the method by Koster. Intraperitoneal injection of an aqueous solution of acetic acid (60 mg/kg) induces, in mice, characteristic repeated stretching motions under the effect of pain.

Administration per os, within the thirty minutes following said administration, of a dosage of 100 mg/kg of the derivatives according to this invention, decreases the number of characteristic motions.

With respect to dextropropoxyphene (reference antalgic material), the compounds according to this invention exhibit non-negligible antalgic characteristics.

c. Diuretic activity

This activity was investigated in rats. The compounds of this invention were administered at a dosage of 100 mg/kg by gastric intubation, and the reference material (triamterene) was also administered at a dosage of 100 mg/kg.

The average results reported below correspond to the overall determinations carried out on lots of four rats each.

Said results are in favour of a good anti-inflammatory, antalgic and diuretic activity of the compounds of this invention.

Thus, the composition of this invention may be advantageously used for anti-inflammatory, antalgic and diuretic purposes.

The composition is advantageously formulated in unit dosage form for oral administration (such as tablets, coated tablets or capsules), rectal administration (suppositories) and parenteral administration (as injectable solution).

In such pharmaceutical forms, the active ingredient is combined with suitable known carriers or excipients. Each unit dose may contain from 0.050 to 0.500 g of active ingredient and the daily dosage regimen may vary within a range from 0.050 to 1.500 g.

Non limiting examples of formulations of the composition of this invention are given below.

EXAMPLE 9 - TABLETS

| | |
|---|---|
| 3-(4-Methyl-piperazin-1-yl)-2-phenyl-2,3-dihydro-benzo[b]thiophene-1,1-dioxide | 0.200 g |
| Lactose<br>Corn starch<br>Talc<br>Magnesium stearate | q.s. for one tablet weighing about 0.280 g |

EXAMPLE 10 - COATED TABLETS

| | |
|---|---|
| Core | |
| 3-(1-perhydroazepinyl)-2-phenyl-)2,3-dihydro-benzo[b]thiophene-1,1-dioxide | 0.100 g |
| Lactose<br>Corn starch<br>Talc<br>Magnesium stearate | q.s. to make 0.200 g |
| Coating | |
| Shellac<br>Gum arabic<br>Talc<br>Titanium dioxide<br>Tartrazine<br>Carnauba wax<br>Sugar | q.s. for one coated tablet weighing about 0.380 g |

EXAMPLE 11 - CAPSULES

| | |
|---|---|
| 2-phenyl-3-piperidino-2,3-dihydro-benzo[b]thiophene-1,1-dioxide | 0.150 g |
| Talc<br>Magnesium stearate | q.s. to make 1 capsule |

| | from 0 to 5 hours | | | from 0 to 24 hours | | |
|---|---|---|---|---|---|---|
| | untreated controls | compound of this invention | reference material | Untreated controls | compound of this invention | reference material |
| Urinary volume ml/kg | 5.45 | 23.0 | 21.4 | 13.15 | 29.2 | 32.3 |
| Sodium (mEq) | 0.38 | 1.61 | 2.41 | 1.56 | 3.03 | 6.80 |
| Potassium (mEq) | 0.19 | 0.32 | 0.14 | 0.82 | 1.02 | 1.09 |

EXAMPLE 12 - SUPPOSITORIES

| | |
|---|---|
| 3-morpholino-2-phenyl-2,3-dihydro-benzo[b]thiophene-1,1-dioxide | 0.300 g |
| Semi-synthetic glycerides, q.s. to make 1 suppository weighing | 1.500 g |

EXAMPLE 13 - INJECTABLE SOLUTION

| | |
|---|---|
| 2-phenyl-3-(1-pyrrolidinyl)-2,3-dihydro-benzo[b]thiophene-1,1-dioxide | 0.250 g |
| Isotonic solvent | q.s. to make 10 ml |

EXAMPLE 14 - GRANULES

| | |
|---|---|
| 3-(4-methyl-piperazin-1-yl)-2-phenyl-2,3-dihydro-benzo[b]thiophene-1,1-dioxide | 5 g |
| Citric acid | |
| Sodium chloride | |
| Powdered gum arabic | q.s. to make 100 g of granules |
| Sweetening agent | |
| Sugar | |

The composition of this invention may be usefully administered for therapeutic purposes. It is particularly applicable in all inflammatory or painful phenomena, whatever their etiology.

In view of its rapid and extended action, of its absence of side-effects, of its good tolerance particularly with respect to the digestive tract, it is an efficient therapeutic composition which may be used conveniently during extended treatments.

From the standpoint of its diuretic activity, the highly controllable composition of this invention permits the treatment of all forms of water and salt retention, of any origin, the essentially natriuric activity and its renal tolerance permitting the regular treatment of all forms of permanent arterial hypertensions. In addition, in view of its good tolerance, it produces no digestive, endocrinologic or sensory disorders.

Having now described my invention what I claim as new and desire to secure by letters patent is:

1. A compound having the formula:

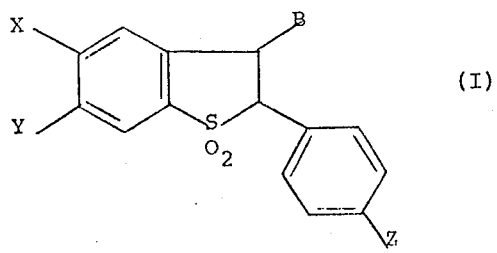

(I)

in which X and Y are individually selected from the group consisting of a hydrogen atom, a chlorine atom, a bromine atom and the lower alkyl groups having 1–4 carbon atoms; Z is selected from the group consisting of a hydrogen atom, a chlorine atom, a bromine atom, the lower alkyl groups having 1–4 carbon atoms and the lower alkoxy groups having 1–4 carbon atoms; and B is a member selected from pyrrolidino, piperidino, morpholino, hexamethyleneimino, piperazino and piperazino substituted at the second nitrogen atom with an alkyl group having 1–3 carbon atoms; or a pharmaceutically acceptable acid addition salt of said compound.

2. 2-Phenyl-3-piperidino-2,3-dihydro-benzo[b]thiophene-1,1-dioxide.

3. 3-Morpholino-2-phenyl-2,3-dihydro-benzo[b]thiophene-1,1-dioxide.

4. 2-Phenyl-3-(1-pyrrolidinyl)-2,3-dihydro-benzo[b]thiophene-1,1-dioxide.

5. 3-(1-Perhydroazepinyl)-2-phenyl-2,3-dihydro-benzo[b]thiophene-1,1-dioxide.

6. 3-(4-Methyl-piperazin-1-yl)-2-phenyl-2,3-dihydro-benzo[b]thiophene-1,1-dioxide.

7. 2-Phenyl-3-(piperazin-1-yl)-2,3-dihydro-benzo[b]thiophene-1,1-dioxide.

8. 5-Chloro-3-(4-methyl-piperazin-1-yl)-2-phenyl-2,3-dihydro-benzo[b]thiophene-1,1-dioxide.

9. 2-(4-Chloro-phenyl)-3-(4-methyl-piperazin-1-yl)-2,3-dihydro-benzo[b]thiophene-1,1-dioxide.

* * * * *